(No Model.)

A. LOHBILLER.
SAFETY VALVE.

No. 463,261. Patented Nov. 17, 1891.

Witnesses.
Ralph W. E. Hopper.
Eben Hutchinson, Jr.

Inventor.
Anton Lohbiller
per Eugene Humphrey
his Atty.

UNITED STATES PATENT OFFICE.

ANTON LOHBILLER, OF BOSTON, MASSACHUSETTS.

SAFETY-VALVE.

SPECIFICATION forming part of Letters Patent No. 463,261, dated November 17, 1891.

Application filed April 2, 1891. Serial No. 387,462. (No model.)

*To all whom it may concern:*

Be it known that I, ANTON LOHBILLER, of Boston, in the county of Suffolk and State of Massachusetts, have invented a new and useful Improvement in Safety-Valves for Steam-Boilers, which will, in connection with the accompanying drawings, be hereinafter fully described, and specifically defined in the appended claims.

My invention relates to safety-valves for steam-boilers, and especially to improvements in the devices commonly employed in such valves for regulating the escape of steam after the valve is lifted thereby to secure prompt reaction and closing of the valve without undue waste of steam-pressure in relieving the boiler; and my improvement has for its object to furnish such a regulating device, which shall be more conveniently accessible and adjustable from the outside of the valve casing or shell than the devices hitherto employed, especially in valves used on locomotive-boilers; and my invention consists in the novel features hereinafter fully described, and pointed out in the appended claims.

Figure 1:
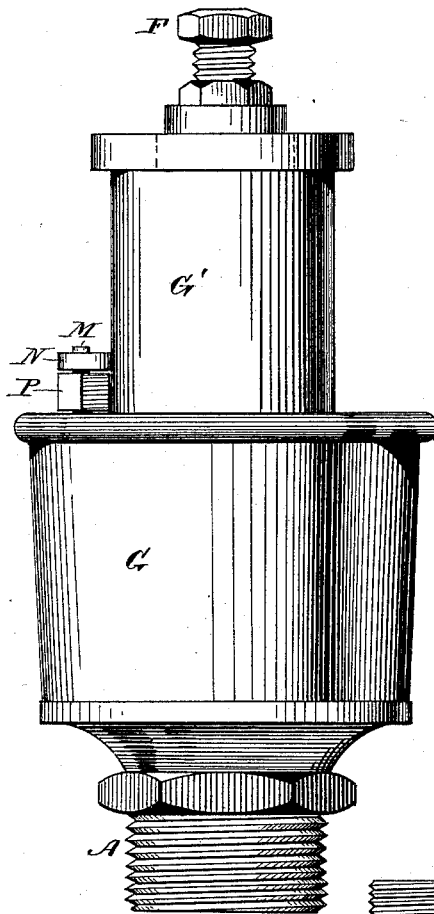
Figure 2:
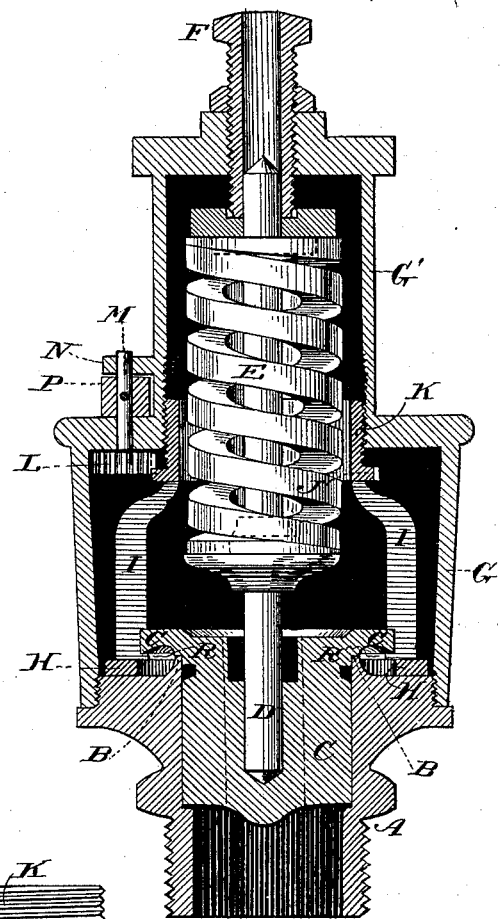
Figure 3:
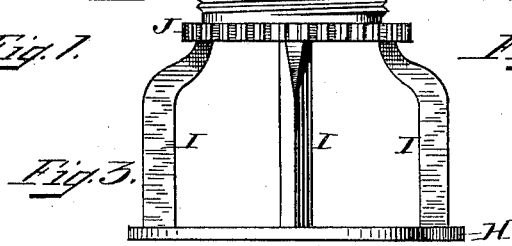
Figure 4:
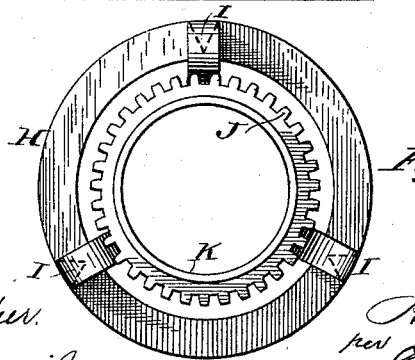

In the accompanying drawings, Figure 1 is an elevation of a safety-valve embodying my invention. Fig. 2 is a central longitudinal section of the same, but showing the valve-spindle and the depressing-spring in elevation. Fig. 3 is a detached elevation of the adjustable regulator or auxiliary valve composed of an annular base secured to standards, upon which are mounted a gear and threaded collar. Fig. 4 is a plan of the same.

The valve illustrated in the drawings contains many features common to valves already in public use, which, being well known, it is deemed unnecessary to particularly describe, including the base A, which comprises the valve-seat B; the valve C, of usual form and construction; the spindle D, seated in the valve, and depressing-spring E, with its hollow pressure-adjusting screw F, none of which in and of themselves constitute any part of my invention.

To limit and regulate the escape of steam for the purpose already stated, after the valve C is lifted by the steam-pressure against the force of its depressing-spring E, I employ the auxiliary device or regulator, composed of an annular base H, attached to the curved triangular standards I, upon which are mounted a gear J and a threaded collar K. Collar K, when the regulator is in place, is screwed centrally into the upper portion G' of the inclosing case G, which is threaded to receive the same, and which case G has also the usual openings in its top to permit the escape of the steam therefrom. A pinion L is arranged within the case to engage gear J, as shown. This pinion is secured to the lower end of a vertical pin M, fitted to turn in bearings in case G, and an arm N, projecting from the part G' of the case. Upon this pin, between arm N and the case, is secured an angular wrench-block or nut P, by which pin M and its pinion are held up in place, and through which the same are turned in either direction by the application of a suitable wrench to the block. When collar K is threaded into the case, as shown, the annular base H, connected with the collar through the standards I, surrounds the valve-seat B, and its interior diameter is slightly larger than the diameter of the top of valve C, so that the latter can pass freely through it. When ring H is adjusted in its lowest position, it rests on the base A and surrounds the valve-seat, as shown. When the regulator is in that lowest position, then the largest opening for the escape of steam, when the valve is lifted, exists, and consists of an annular space R, equal in width to the distance between the upper inner corner of ring H and the lower outer corner of valve C. This space may be diminished to the required degree, for the purpose stated and well understood, by placing a wrench upon block P and turning the same, together with pinion L, in the proper direction to impart the requisite movement to gear J to screw the collar K upward in case G, which will raise ring H and bring it nearer to the peripheral edge or lip of valve C, and thus correspondingly close the steam-space between the two. By thus using a wrench upon block P, outside of and above the casing G, ring H, through the action of the gearing, is rotated freely around valve C, and at the same time, through the action of the screw-collar K threaded in the casing, is moved vertically. If the ring H occupies a higher position than is desired, it is only necessary to turn the wrench in the opposite direction and reverse the movements just described to bring the ring down to the point of adjustment required. Thus ring H, in its relations to valve C and the steam-space between them, may be readily adjusted up or down, and said steam-space be thereby increased or diminished, as may be desired, to effect, in conjunction with valve C, the proper relief of the boiler without undue waste of steam-pressure. Such adjustment, through the means described, is easily and conveniently effected from outside the casing without shutting off steam, disturbing the casing, or in any manner detaching or displacing any of the parts of the valve. After such adjustment, if found to be necessary or desirable, the pinion L may be locked in any convenient manner to prevent the adjuster from being turned and displaced by the action of the escaping steam; and, to cheapen and simplify the adjusting device for use on other than locomotive-boilers, I have contemplated modifying the invention by omitting the actuating-pinion and substituting for gear J a plain perforated ring, of somewhat larger diameter, to serve, in connection with a screw-stud extending from the top of the casing into the perforations in the ring, to fasten the regulator in place, and turning the regulator by the standards I, using thereon any convenient hand tool or attachment through the openings in the top of the case.

It is obvious that the pin P might be extended upward and have its wrench-block secured thereto at the top of the highest part of the casing G', if desired; and a great advantage is derived, when the valve is used in the usual manner on locomotive-boilers, from having the facilities for adjusting and regulating the valve easily accessible above the usual surrounding objects attached to such boilers about the base of the valve.

I claim—

1. The combination, in a safety-valve, of a base A, valve C, case G, and auxiliary ring H, said ring being secured to standards I, to which is attached a collar K, which is threaded in the case, whereby the ring is adapted to be operated in connection with the case and in relation to the valve, substantially as and for the purposes specified.

2. The combination of base A, valve C, and case G, with auxiliary steam-regulating mechanism consisting of ring H, standards I, gear J, collar K, pinion L, and means for actuating said pinion, all co-operating as and for the purposes specified.

3. The combination, with a valve, valve-seat, and inclosing case, of an auxiliary ring H, wholly within the case and connected with the interior thereof by screw-threads, and arranged to be operated from outside through openings in the case by turning the ring about the axis of the valve and thereby adjusting it up or down in relation to the lip of the valve by means of screw-threads cut in the interior wall of the case with which it is connected, substantially as and for the purposes specified.

ANTON LOHBILLER.

Witnesses:
EUGENE HUMPHREY,
RALPH W. E. HOPPER.